UNITED STATES PATENT OFFICE.

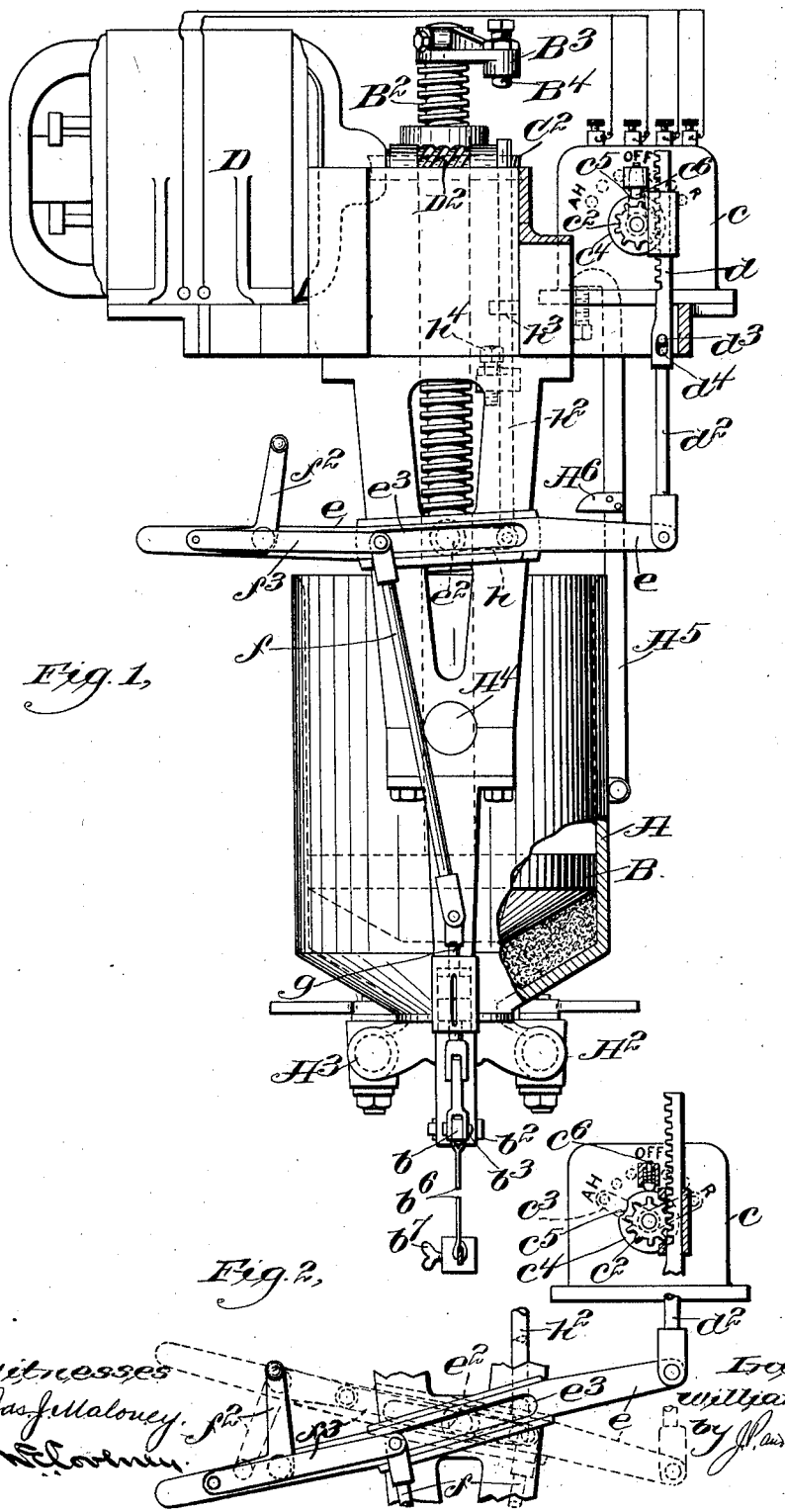

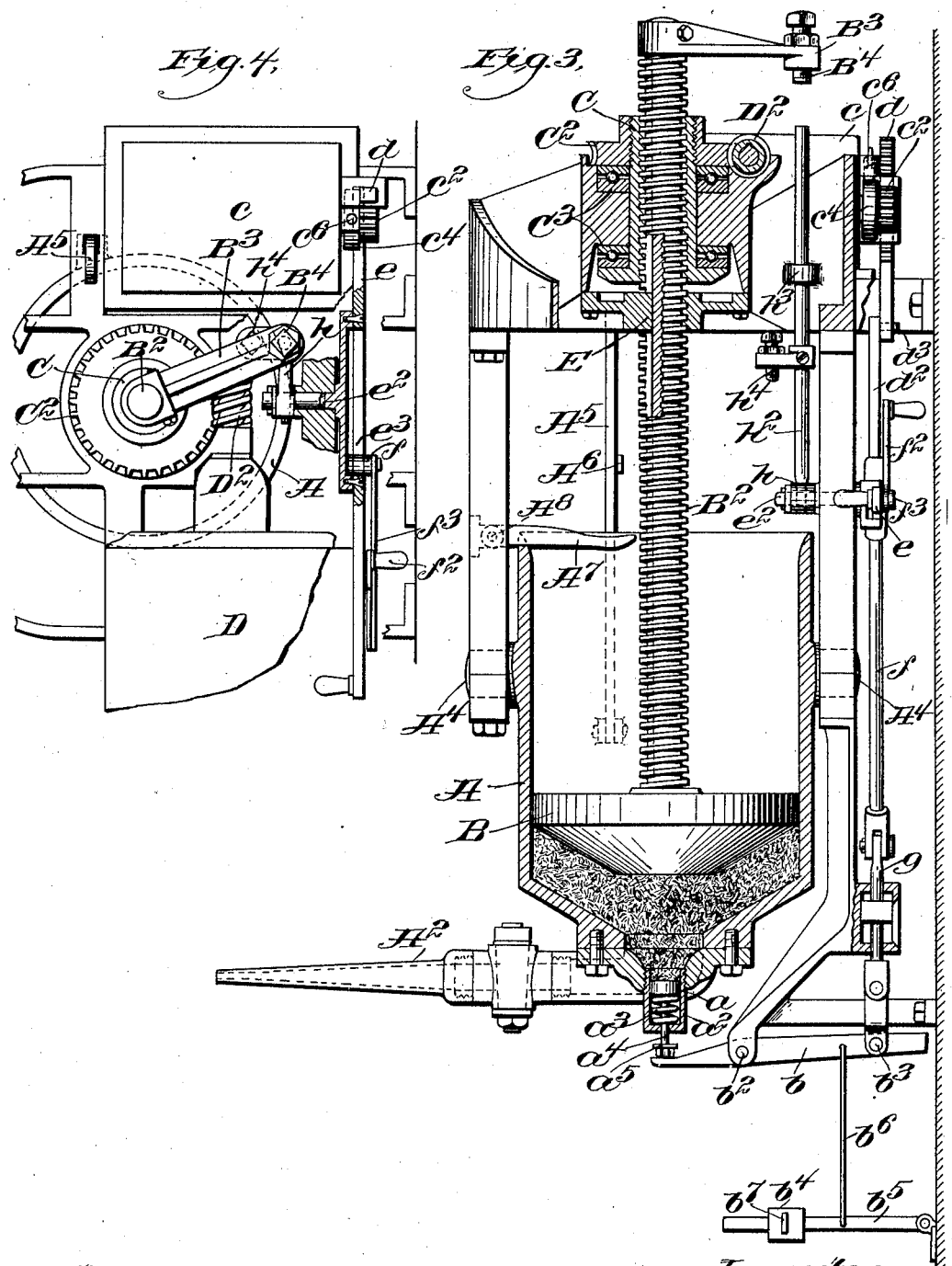

WILLIAM H. BAZLEY, OF EVERETT, MASSACHUSETTS, ASSIGNOR TO THE ELECTRIC COMPRESSING MACHINE COMPANY, A CORPORATION OF MASSACHUSETTS.

SAUSAGE-STUFFING MACHINE.

1,002,487.      Specification of Letters Patent.      Patented Sept. 5, 1911.

Application filed December 7, 1908. Serial No. 466,334.

*To all whom it may concern:*

Be it known that I, WILLIAM H. BAZLEY, a citizen of the United States, residing in Everett, in the county of Middlesex and State of Massachusetts, have invented an Improvement in Sausage-Stuffing Machines, of which the following description, in connection with the accompanying drawings, is a specification, like letters on the drawings representing like parts.

The present invention relates to a sausage stuffing machine, and is embodied in a novel pressure regulating device for the meat in the receptacle, so that the speed of movement of the expressing plunger is regulated automatically in accordance with the quantity of meat flowing through the nozzle or nozzles, and the machine automatically stopped if the outlet for the meat is wholly cut off.

The machine in which the invention is embodied is of that type in which the meat is contained in a receptacle provided with one or more suitably controlled stuffing nozzles to receive the sausage skins, the meat being pressed out through the nozzles by a plunger arranged to reciprocate within the receptacle. The plunger is preferably operated by means of a worm and screw which gives it a slow and powerful movement, the plunger being provided with a threaded upright which is held from turning, there being a rotatable nut on said upright which is operated by a worm gear driven by a suitable motor.

It is the purpose of the present invention to regulate the speed of the motor in such a way as to maintain a substantially uniform pressure upon the meat, regardless of the quantity which is being discharged, and to this end the motor is controlled through the agency of a plunger or piston which is subjected to the pressure of the meat within the receptacle. By this construction, in cases where two or more nozzles are employed, they may be operated independently, since the closing of a nozzle after filling the skin will not result in an excess of pressure through another nozzle which may be open, for the reason that the velocity of the plunger is automatically reduced to compensate for the difference in the outlet capacity.

The machine is herein shown as driven by an electric motor controlled by a rheostat, it being obvious, however, that other forms of motor might be used and equipped with suitable controlling devices operated by the same or equivalent controlling mechanism.

In the ordinary operation of the machine, the motor controlling device is mechanically operated to stop the motor at each end of the plunger stroke, the starting of the motor in the "ahead" or "reverse" direction being under the control of the operator. The controlling device is so connected with the pressure regulating member as to vary the plunger speed in response to variations in pressure, and to stop the machine when the pressure reaches a certain predetermined limit, the result being that if all the nozzles are closed, the machine will be automatically stopped when the compression of the contents of the receptacle has reached a certain limit. Under these conditions, it is necessary to produce an abnormal movement of the manual controlling device for the purpose of starting the motor in a reverse direction to release the pressure, the construction of the manual controlling device which will be hereinafter described forming a feature of the invention.

Figure 1 is a rear elevation of a machine embodying the invention with parts broken away and shown in section; Fig. 2 is a detail showing in full and dotted lines the manual controlling device in the "ahead" and "reverse" positions; Fig. 3 is a vertical section on a plane at right angles to that of Fig. 1; and Fig. 4 is a top plan view partly in section.

The machine embodying the invention is provided with the meat receptacle A which is of the usual type and cylindrical in shape, the said receptacle being shown as provided with two stuffing nozzles $A^2$ and $A^3$, each of which is provided with a shut-off cock, as shown in Fig. 3. The meat contained in the receptacle A is adapted to be forced out through the nozzles $A^2$ and $A^3$ by means of a reciprocating plunger B which is shown as provided with a threaded stem $B^2$ projecting upward from the top, and engaging screw threads in a rotating nut C which is provided with a gear $C^2$ meshing with a worm $D^2$ driven by a motor D which is herein shown as an electro-motor.

The nut C is mounted in ball bearings $C^3$, and the stem $B^2$ is prevented from rotation by means of a projection E which enters a groove formed in said stem. By this construction, the rotation of the motor in one direction will force the plunger down to express the meat, while the rotation of the motor in the opposite direction will withdraw the plunger from the receptacle, so that the latter can be refilled. In the construction shown, the receptacle is mounted on trunnions $A^4$, and provided with a pivotally supported upright $A^5$ having a projection $A^6$ in the path of the plunger, so that as the latter rises it will lift the upright $A^5$ and tip the receptacle on the trunnions exposing the mouth of the receptacle, so that the latter can be readily filled.

Where two or more nozzles are employed, it frequently happens that all of the nozzles are not open at the same time, and if the movement of the plunger is uniform throughout, the closure of one nozzle will cause an excess pressure at the others which results in a lack of uniformity in the stuffing operation, and, in fact, frequently causes the skins to burst.

It is the purpose of the present invention to regulate the speed of the plunger to correspond to the outlet area, and also to bring the machine automatically to a stop in case all the nozzles are closed while the plunger is in operation. For this purpose the motor controlling device is arranged to be acted upon by a movable abutment which is subjected to the pressure of the meat in the receptacle, the said abutment being herein shown (Fig. 3) as a piston $a$, operating in a pocket $a^2$ formed in a wall of the receptacle the said pocket being herein shown as located directly below the plunger B. The piston $a$ acts against a spring $a^3$ which moves it in the opposite direction when the pressure is relieved, so that the position of said piston is controlled entirely in accordance with the amount of pressure within the receptacle. The said piston is provided with a stem $a^4$ which is herein shown as projecting through a wall in the pocket $a^2$ and as being provided with a collar $a^5$ to determine the normal position of the piston when there is no pressure thereon. This piston acts on a lever $b$ which is pivotally supported at $b^2$ and connected directly with the controller $c$ which is herein shown as a rheostat arranged to control the speed of the electro-motor in both the ahead and reverse directions.

In the construction shown, the rheostat $c$ is provided with a pinion $c^2$ and switch arm $c^3$ which is adapted to move in either direction from the neutral or "off" position shown in Fig. 1, so that the rotation of said pinion will start the motor "ahead," or in the "reverse" direction, according to the direction of such rotation. The pinion $c^2$ is directly acted upon by the rack $d$ which is connected with one end of a rocking lever $e$ pivoted at $e^2$, and having a slot $e^3$ to engage a lateral projection from a swinging link $f$. The said link $f$ in turn is pivotally connected with a longitudinally movable rod $g$ connected at $b^3$ to the lever $b$.

It will be seen from the foregoing description that a downward movement of the piston $a$ acting through the lever $b$ will tend to push the rod $g$ upward and rock the lever $c$ toward the dotted line position shown in Fig. 2, so that the rheostat switch arm $c^3$ will travel toward the "reverse" position. The lever $b$, however, is also acted upon by a weight $b^4$, shown as movable longitudinally on an arm $b^5$ pivoted below said lever, and connected therewith by a hanger $b^6$. By sliding the weight along said arm to or from the fulcrum, the pressure at which the machine will stop may be regulated. The weight is shown as provided with a thumbscrew $b^7$ to hold it in any desired position.

It is obvious that when there is no pressure in the receptacle, there will be no resistance to the downward movement of the lever $b$, and if the parts are in the neutral position shown in Fig. 1, the lever $e$ will be rocked by the weight to the full line position shown in Fig. 2, thus moving the rheostat arm $c^3$ to the left, and starting the motor full speed ahead. Should the egress of meat be stopped, however, pressure would be brought to bear upon the piston $a$ which, acting against the weight $b^4$, would lift the said weight and correspondingly lift the lever $e$ from the full line position shown in Fig. 2 to the position shown in Fig. 1, until the switch member $c^3$ reached the "off" position when the motor would cease to operate, causing the machine to stop. If the machine is to be started ahead again, it is only necessary to open a nozzle, thus relieving the pressure and permitting the controller to act automatically.

Since the motor slows down as the switch arm approaches the "off" position, it is desirable that the said arm should snap from the last contact to prevent arcing and burning out the contacts. In the construction shown, the rotary member which carries the switch arm $c^3$ is provided with a disk $c^4$ having a notch $c^5$ coöperating with a spring plunger $c^6$. As the notch reaches the plunger in the rotary movement of the disk, the spring will act, and will cause a rapid movement of the arm out of contact with the last stationary contact of the rheostat. Since this snap movement must be independent of the actuating movement of the lever $e$, the rack $d$ is arranged to have a lost motion connection with the said lever $e$. In the construction shown a link $d^2$ is interposed between the rack $d$ and the lever $e$, said link having a pin $d^3$ which engages in an elongated slot $d^4$ formed in the rack-member $d$.

With no pressure in the receptacle, it is obvious that if the link $f$ were shifted to the right hand end of the slot $e^3$, the weight $b^4$ would act to carry the lever $e$ to the dotted line position shown in Fig. 2, thus causing the motor to reverse. If, however, the conditions are those shown in Fig. 1, in which the plunger B has stopped with meat under pressure in the receptacle, it is obvious that the weight is balanced by the pressure, and, consequently, will exert no downward pull upon the right hand end of the lever $e$ when the link $f$ is shifted to the right hand end of the slot. In order, therefore, that the machine may be reversed under these conditions, the slot $e^3$ is slightly inclined upward toward the right, so that the shifting of the link $f$ to the right hand end of the slot will depress the right hand end of the lever to a slight extent,—sufficient at least to start the motor in the reverse direction, and the subsequent lift of the plunger B will at once release the pressure and allow the weight to act, throwing the motor to the full speed reverse.

From the foregoing description, it will be seen that when the machine is operating to its full capacity, that is to say, with all the nozzles open, the lever $e$ will be in the position shown in full lines, Fig. 2, and the motor running full speed ahead, the rheostat arm $c^3$ being in the extreme "ahead" position with all the resistance cut out. If the pressure is increased by the closure of one of the nozzles, or otherwise, the increased pressure will produce a movement of the lever $b$ tending to lower the right hand end of the lever $e$, and move the rheostat arm $c^3$ toward the "off" position, thereby cutting in resistance and checking the speed of the motor. If the egress of the meat is cut off altogether, pressure will be exerted to move the piston $a$ until the lever $e$ is carried to the neutral position shown in Fig. 1, thereby shutting off the motor and stopping the operation of the plunger. To start the motor ahead under these conditions it is only necessary to open a nozzle, thus releasing the pressure. On the contrary, if it is desired to reverse the motor, the link $f$ is thrown to the opposite end of the slot $e^3$, through the agency of the actuating handle $f^2$ which is shown as an elbow lever pivoted on the lever $e$ and connected with the link $f$ by means of the link $f^3$. Owing to the upward inclination of the slot $e^3$, herein described, this will produce a slight downward movement of the rack $d$, starting the motor in the reverse direction at slow speed, it being obvious that, as soon as the pressure is relieved, the weight $b^4$ will act to throw the motor to full speed in the reverse direction.

In the continuous operation of the machine, assuming that no stop is made under the conditions shown in Fig. 1, the motor is arranged to be stopped when the plunger B reaches either end of its stroke through the agency of mechanically operating devices. To this end, the lever $e$ has connected therewith a crank arm $h$ which is shown as radially connected with the stud on which said lever is fast, and which constitutes the fulcrum of said lever, the said arm $h$ having connected therewith a rod $h^2$ which is arranged to be acted upon by the plunger B or parts movable therewith. In the construction shown, the said rod $h^2$ projects upward toward the top of the machine through a guide or bearing $h^3$, the upper end of the said rod being in the path of a projection $B^3$ connected with the threaded stem $B^2$ by which the plunger is actuated. As the plunger reaches the bottom of the receptacle, the adjustable member $B^4$, which is connected with the member $B^3$, will come into contact with the upper end of the rod $h^2$, and force the said rod downward from the full line position shown in Fig. 2. Such downward movement of the rod $h^2$ will rock the stud to which the lever $e$ is connected, turning the lever so as to carry the rheostat arm $c^3$ from the "ahead" position to the "off" position, it being obvious that, as soon as the said "off" position has been reached, the motor will stop and the parts will be in the position shown in Fig. 1, except that the plunger B will be at the bottom of the receptacle with no pressure being exerted upon the piston $a$. If, therefore, the handle $f^2$ is then operated to throw the link $f$ to the opposite end of the slot $e^3$, the weight $b^4$ will act to throw the right hand end of the lever $e$ down, thus starting the motor at full speed in the "reverse" direction. As the plunger reaches the top of its stroke, it will come into contact with an adjustable stop $h^4$ of the rod $h^2$, and will lift the same, carrying the right hand end of the lever $e$ upward and the rheostat switch member $c^3$ to the left until the latter reaches the "off" position and stops the motor. The same upward movement of the plunger acts upon the projection $A^6$ from the connecting member $A^5$, and tips the receptacle A out of the path of the plunger, so that the said receptacle is accessible for filling. To start the motor D ahead, the handle $f^2$ is restored to the position shown in Fig. 1, whereupon the weight $b^4$ will act to throw the lever $e$ to the full line position shown in Fig. 2, thereby starting the motor full speed ahead. As soon as the plunger leaves the projection $A^6$, the receptacle A will move back to its operative position through force of gravity, the trunnion support for said receptacle being above the center of gravity thereof. The receptacle is then held from tipping by a gravity latch $A^7$, pivoted to the frame at $A^8$, and extending into the path of the plunger, as shown in Fig. 3, so as to be raised when the plunger in its upward movement passes out of the receptacle.

Furthermore, where a number of nozzles are employed in connection with the same machine, it is immaterial how many of the said nozzles are shut off at a time, since the pressure on the remaining nozzle or nozzles will be regulated accordingly, and the stuffing operation in each case will be uniform.

Claims:

1. In a sausage stuffing machine, a meat-receptacle; a reciprocating plunger; a motor to operate said plunger; means for controlling the egress of the meat from the receptacle; a controlling device for the said motor; and means for operating said controlling device actuated by the pressure of the plunger on the meat in the receptacle.

2. The combination with a receptacle provided with a controllable nozzle; of an expressing plunger working in said receptacle; a motor to operate said plunger; a controller for said motor; and an actuating device for said controller operated by the pressure exerted by said plunger on the meat in the receptacle.

3. The combination with a receptacle for meat provided with a stuffing nozzle; of a plunger working in said receptacle to express the meat through said nozzle; a motor to operate said plunger; a controlling device for said motor; a movable abutment subjected to a yielding pressure at one side, and on the other side to the action of the meat in the receptacle when under the pressure exerted by the plunger; and means for connecting said movable abutment with said controller.

4. In a sausage stuffing machine, the combination with a receptacle for the meat provided with stuffing nozzles; of a reciprocating plunger working in said receptacle; a reversible motor to operate said plunger; means for controlling the speed and direction of rotation of said motor; a rocking member connected with said controlling means to move the same in one direction or the other; a weight adapted to act upon said rocking member; means for shifting the point of connection between said weight and said rocking member across the fulcrum of said rocking member; and a device controlled by the pressure of the meat in the receptacle arranged to act in opposition to said weight, substantially as described.

5. The combination with a receptacle provided with stuffing nozzles; of a plunger movable in said receptacle to express the contents thereof through said nozzles; a motor for said plunger; a controller for said motor; a pivotally supported lever connected with said controller, said lever having a slot or recess extending across the fulcrum of the lever and inclined with relation to said lever; a link engaging said slot and adapted to be shifted from one end to the other thereof; and a lever connected with said link, said lever being acted on at one side of its fulcrum by a constant force; and at the other side of said fulcrum by the variable pressure in the receptacle.

In testimony whereof, I have signed my name to this specification in the presence of two subscribing witnesses.

WILLIAM H. BAZLEY.

Witnesses:
JAS. J. MALONEY,
M. E. COVENEY.

Copies of this patent may be obtained for five cents each, by addressing the "Commissioner of Patents, Washington, D. C."